United States Patent [19]

Bezama et al.

[11] Patent Number: 5,302,562
[45] Date of Patent: Apr. 12, 1994

[54] METHOD OF CONTROLLING THE DENSIFICATION BEHAVIOR OF A METALLIC FEATURE IN A CERAMIC MATERIAL

[75] Inventors: Raschid J. Bezama, Mahopac; Donald R. Wall, Wappingers Falls, both of N.Y.

[73] Assignee: International Business Machines Corporation, Armonk, N.Y.

[21] Appl. No.: 967,596

[22] Filed: Oct. 28, 1992

[51] Int. Cl.$^5$ .................................................. B22F 7/04
[52] U.S. Cl. ........................................ 501/99; 419/54
[58] Field of Search .................. 501/99, 127, 153; 252/512; 156/89; 428/137; 419/10, 6, 11, 36, 54, 57, 58; 264/65, 63

[56] References Cited

U.S. PATENT DOCUMENTS

| | | | |
|---|---|---|---|
| 4,020,206 | 4/1977 | Beil | 428/137 |
| 4,234,367 | 11/1980 | Herron et al. | 156/89 |
| 4,301,324 | 11/1981 | Kumar et al. | 174/68.5 |
| 4,594,181 | 6/1986 | Siuta | 252/512 |
| 4,671,928 | 6/1987 | Herron et al. | 419/10 |
| 4,776,978 | 10/1988 | Herron et al. | 252/512 |
| 4,964,948 | 10/1990 | Reed | 156/659.1 |

OTHER PUBLICATIONS

IBM patent application Ser. No. 07/758,991, Filed Sep. 10, 1991, Aoude, et al., "Copper-Based Paste Containing Copper Aluminate for Microstructural and Shrinkage Control of Copper-Filled Vias".

Primary Examiner—Mark L. Bell
Assistant Examiner—A. Wright
Attorney, Agent, or Firm—Ira David Blecker

[57] ABSTRACT

Disclosed is a method of controlling the densification behavior of a metallic feature in a ceramic material, the method including the steps of:

obtaining an unsintered ceramic material having at least one metallic feature therein;

providing at least the metallic feature with a predetermined amount of carbonaceous material;

heating the ceramic material and metallic feature to a predetermined temperature sufficient to cause sintering of the ceramic material, the metallic feature being at least partially inhibited from densifying at the predetermined temperature by the presence of the carbonaceous material.

key aspect of the invention is subsequently removing with an oxidizing ambient some or, all of the carbonaceous residue at a predetermined temperature for the optimization of the physical characterization of the fired metallic component in ceramic material without adversely affecting distortion and alignment of the metallic feature.

22 Claims, 2 Drawing Sheets

METHOD OF CONTROLLING THE DENSIFICATION BEHAVIOR OF A METALLIC FEATURE IN A CERAMIC MATERIAL

BACKGROUND OF THE INVENTION

The present invention generally relates to metallic features in bulk ceramic materials and, more particularly, to a method of controlling the densification behavior of the metallic feature in the ceramic material by incorporating in the metallic feature an amount of carbonaceous material which inhibits the sintering of the metallic feature.

While the present invention has applicability to, in general, metallic features in ceramic materials, it has particular application to metallic screened lines or vias in ceramic substrates for electronic applications. Therefore, for the sake of clarity only, the remainder of the discussion of the invention will be concentrated on metallic vias in ceramic substrates.

The use of metal-filled vias and/or screened lines in ceramic substrates and sintering processes for producing them are well known in the semiconductor packaging art as taught, for example, in Herron et al. U.S. Pat. No. 4,234,367, the disclosure of which is incorporated by reference herein. Recently, more interest has been focused on the associated problems of the disparity in shrinkage rates between the metal and ceramic as well as the onset of via "opens", particularly as via diameters are reduced below 100 microns in high circuit density applications. A discussion of such problems is given in Herron et al. U.S. Pat. No. 4,776,978, the disclosure of which is incorporated by reference herein.

As set forth in the cited U.S. Pat. No. 4,776,978, metal particles, such as copper, in the via paste undergo sintering with attendant shrinkage of the thick film pattern (also consisting of the paste) during the initial phase of the sintering cycle whereas the ceramic and glass particles (of the ceramic substrate containing the vias) undergo sintering during the intermediate and final phases of the sintering cycle along with their characteristic shrinkage. One method of delaying the onset of sintering of the metal particles until at least the intermediate phase of the sintering cycle is to intersperse the metal particles in the thick film with a high melting point material such as aluminum oxide.

Although the foregoing generalized considerations have been known in the art for some time and have provided the basis for techniques for overcoming previous shrinkage and related problems, more refined and detailed approaches are required to meet the needs of metal-filled vias and/or screened lines in ceramic substrates with increasing circuit densities and the concomitant via diameters in the range of about 85 to 100 microns. It is also desirable to provide a metallic-based paste mixture which can be adapted for use with the next generation of ceramic packages which may exhibit reduced shrinkage or no shrinkage with sintering wherein the fired metallic conductive features would maintain acceptable electrical conductivity to meet product specifications.

The following references illustrate previous techniques attempting to overcome shrinkage and other problems.

Herron et al. U.S. Pat. No. 4,671,928 teaches the coating of copper particles with an organic material. The coated copper particles are incorporated in a paste and cofired with the ceramic bulk material. The coating on the copper particles is pyrolyzed to a carbonaceous residue during the pyrolysis stage of the sintering cycle. The carbonaceous residue retards the sintering of the copper particles so that they do not begin to densify until the binder burnoff stage of the sintering cycle when an oxidizing ambient is introduced which removes the carbonaceous residue. Once the carbonaceous residue is removed, the copper particles can easily densify. In fact, the copper particles will have densified before the ceramic material sinters.

Siuta U.S. Pat. No. 4,594,181 teaches the dispersal of copper particles in a solution of an organometallic compound in an anhydrous volatile organic solvent towards obtaining a better shrinkage match of copper to ceramic substrates during sintering.

Beil U.S. Pat. No. 4,020,206 discloses a thick film paste for vias which consists of gold particles, glass binder and refractory particles. Among the refractory particles are metallic carbides such as silicon carbide. The purpose of the refractory particles is that since they do not melt at the sintering temperature of the gold paste, they serve to reduce the volumetric shrinkage of the vias to less than 5%.

Reed U.S. Pat. No. 4,964,948 discloses generally a conductive ink consisting of silver flakes, carbon black and fumed silica.

A purpose of the present invention is to have a method of sintering a composite structure comprising metallic features in a ceramic material wherein the metallic features have reduced shrinkage during the sintering of the ceramic material.

Another purpose of the present invention is to have a method of sintering a composite structure comprising metallic features in a porous ceramic material wherein the metallic features have reduced shrinkage (or no shrinkage) during the sintering of the low shrinkage (or no shrinkage) porous ceramic material, and where metallic shrinkage can subsequently be promoted post stabilization of the porous ceramic material for optimization of electrical conductivity of the metallic component.

These and other purposes of the present invention will become more apparent after considering the following description of the invention.

BRIEF SUMMARY OF THE INVENTION

The purposes of the invention have been achieved by providing a method of controlling the densification behavior of a metallic feature in a ceramic material, the method comprising the steps of:

obtaining an unsintered ceramic material having at least one metallic feature therein;

providing at least the metallic feature with a predetermined amount of carbonaceous material;

heating the ceramic material and metallic feature to a predetermined temperature sufficient to cause sintering of the ceramic material, the metallic feature being at least partially inhibited from densifying at the predetermined temperature by the presence of the carbonaceous material.

A key aspect of the invention is subsequently removing with an oxidizing ambient some or all of the carbonaceous residue at a predetermined temperature for the optimization of the physical characterization of the fired metallic component in ceramic material without adversely affecting distortion and alignment of the metallic feature.

BRIEF DESCRIPTION OF THE DRAWINGS

FIG. 5A illustrates the ceramic material after it has sintered but before the metallic feature has sintered while

DETAILED DESCRIPTION OF THE INVENTION

All unsintered (i.e., green) ceramic materials are processed through a sintering cycle to remove the binder materials that hold the ceramic particles together in the unsintered state and to cause the sintering of the ceramic particles. Sintering occurs at temperatures much higher than that necessary to remove the bulk binder material and any other organics present by pyrolysis and volatilization. The step of sintering, per se, is the removal of surface area, usually through diffusion mechanisms. It is necessary for neck growth to occur between adjacent ceramic particles in order for sintering to proceed. However, certain sintering mechanisms, i.e., grain boundary diffusion and lattice diffusion, lead to neck growth and densification whereas other mechanisms, i.e., surface diffusion, cause neck growth without densification. Therefore, densification may or may not occur depending on the degree of porosity desired in the finished product. As a practical matter, sintering may proceed to completion with little densification if there are appropriate sintering retardants present.

A typical sintering cycle consists of a pyrolysis stage where the organic binder material and any other organic materials present are removed by pyrolysis and volatilization. Inevitably, some amount of carbonaceous residue is left behind. Thereafter, the temperature is raised to a higher temperature in a suitable atmosphere to remove the carbonaceous residue and subsequently allow for sintering of the ceramic bulk material as well as any metallic features that are present.

Figure 1:
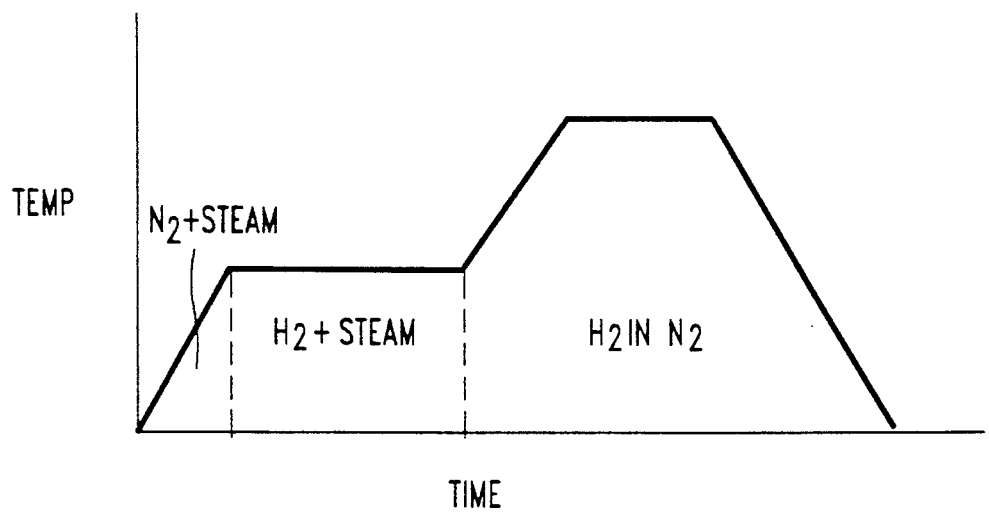
FIG. 1 is a prior art sintering profile.

For technical ceramic materials containing metallic features (e.g., lines and/or vias) that are utilized for electronic applications, a precise sintering cycle is necessary. Such a prior art sintering cycle is illustrated in FIG. 1. The composite structure consisting of the ceramic material and the metallic features first undergoes pyrolysis in a wet nitrogen atmosphere where the polymeric binders of the ceramic material and the metallic features, as well as other organics such as plasticizers, solvents, etc., are pyrolyzed to a carbonaceous residue. After the temperature has been ramped up for pyrolysis, the atmosphere is changed to wet hydrogen and the composite structure is held at that temperature in order for the carbon residue to be burned off. The mechanism is quite well known. Briefly, the carbonaceous residues combine with steam to form hydrogen and carbon monoxide gas which escape from the composite structure. Depending on the efficiency of this step, called binder burnoff, very little or no carbon is left. Thereafter, the atmosphere is changed to an inert or reducing atmosphere and the temperature is ramped to still higher temperatures wherein the sintering of the ceramic material occurs. Depending on the metal present in the metallic feature, the metallic feature may have undergone sintering at a much earlier temperature, resulting in a shrinkage differential between the ceramic material and the metallic feature.

It must be recognized that in the prior art, all the carbonaceous residues are removed from the ceramic material and the metallic features during binder burnoff.

The present inventors, however, have discovered that if the metallic features contain some carbonaceous material past binder burnoff and up through the time when the ceramic material is sintered, i.e., until such time as the ceramic material has achieved its strength characteristics, the metallic features are at least partially inhibited from sintering. The degree to which the metallic features are inhibited from sintering will depend upon the amount of carbonaceous material present.

Figure 2:
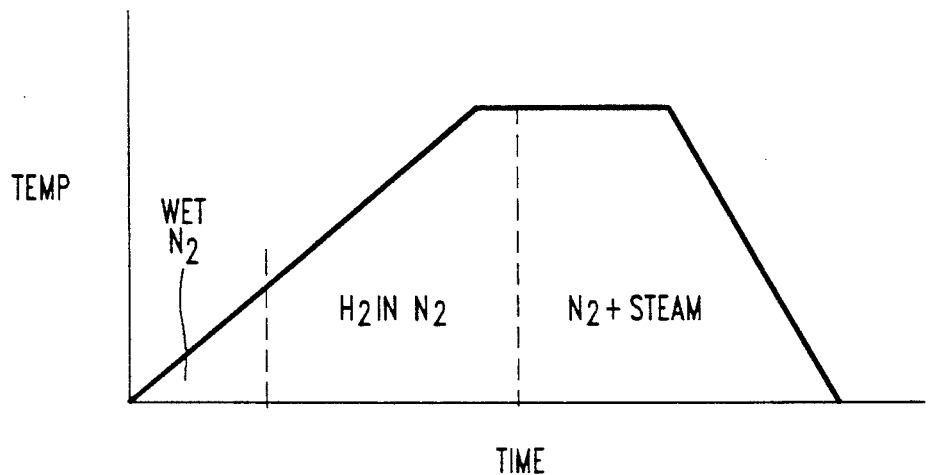
FIGS. 2 to 4 are sintering profiles useful with the method according to the present invention.

Referring now to FIG. 2, there is shown a sintering cycle useful with the present invention. In a first segment of the sintering cycle, the composite structure undergoes pyrolysis in a slightly oxidizing atmosphere such as wet nitrogen (i.e., $N_2$ plus steam). Instead of undergoing binder burnoff, however, the atmosphere is switched to a non-oxidizing atmosphere such as $H_2$ in $N_2$ and the temperature is ramped up through the temperature range in which the ceramic will sinter. The ceramic material and the metallic feature may undergo sintering but with limited mismatched densification due to the presence of the carbon residue. It is, therefore, useful in this embodiment of the invention for the ceramic to contain some interconnected porosity so that after sintering, any residual carbon can be removed from the ceramic. This can be done, for example, by increasing the oxidation potential of the sintering ambient by introducing steam into the reactor. In this way, the carbonaceous residues from the ceramic material and the metallic feature are burned off and the metallic feature densifies. The temperature is then ramped down to room temperature.

As can be appreciated, a unique aspect of the present invention is that after the carbonaceous matter has performed its function of inhibiting the sintering of the metallic features, all or part of the carbonaceous matter is removed. Thus, the sintering inhibitor according to the present invention can be fugitive in nature which is advantageous since there will be a reduced permanent foreign component in the metallic features, once they have been fully sintered. This process of removing the carbon after its usefulness has been exhausted can be tailored such that the physical and electrical properties of the metallic features are optimized.

If a porous ceramic is chosen in the above embodiment, the porosity may be achieved by any number of known means. One method, for purposes of illustration and not limitation, is to use a sintering retardant which retards the extent to which sintering is achieved in the ceramic material. A common sintering retardant is one which has a higher sintering temperature than the ceramic material. One such combination would be alumina in a glass ceramic material. A porous ceramic can be defined as one which has a density after sintering of less than 90% of theoretical.

Figure 3:
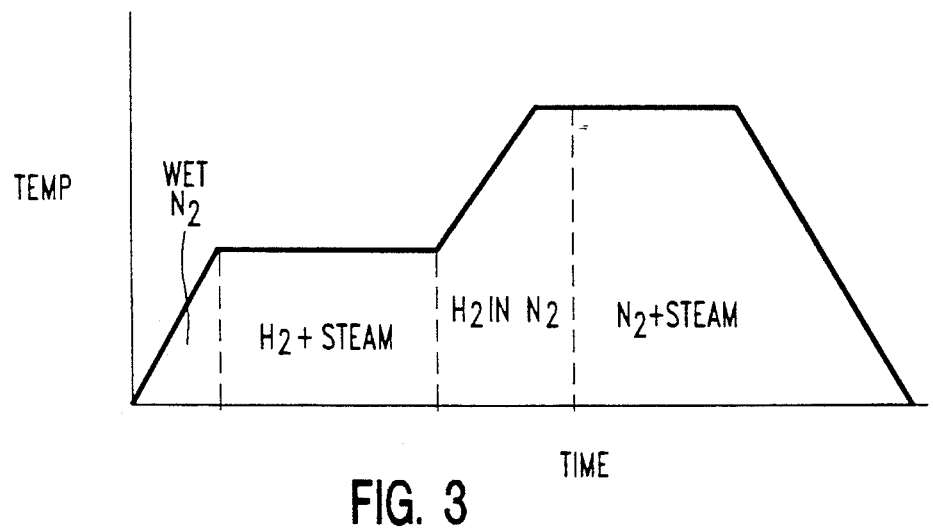

Referring now to FIG. 3, an alternative sintering cycle may be utilized. The composite structure of ceramic material and metallic features first undergoes pyrolysis in a slightly oxidizing atmosphere as before. Now, however, the temperature is held after pyrolysis for a period of time for binder burnoff to occur. As regards the ceramic material, binder proceeds to completion so that substantially all the carbonaceous residues are removed. As regards the metallic features, some carbonaceous matter remains after binder burnoff. This may be accomplished in several ways, two examples of which follow. The first example is that the metallic features comprise, in addition to the polymeric matrix, a carbonaceous material such as graphite or carbon black which at least partially remains after binder burnoff even though the polymeric matrix may be burned off. The second example is to choose two different polymeric materials for the binders wherein the polymeric material of the ceramic material matrix pyrolizes more cleanly than the polymeric material of the metallic features matrix so that after binder burnoff, some carbonaceous residue remains among the metallic particles to inhibit their sintering.

Next, as shown in FIG. 3, the atmosphere is changed to a non-oxidizing atmosphere and the temperature is ramped up through the temperature range in which the ceramic material will sinter. The ceramic material is allowed to sinter in this non-oxidizing ambient while the carbonaceous matter in the metallic features inhibits the sintering of the metallic features so as to closely match the densification behavior of the ceramic up to and including possible no shrink conditions. Once the ceramic material has sintered and achieved its strength characteristics, the atmosphere can be changed to an oxidizing atmosphere and some or all of the remaining carbonaceous matter in the metallic features can be removed. While maintaining the same sintering temperature, the metallic features will then undergo additional sintering and potentially additional densification such that physical properties of the fired conductor are improved as before.

The ceramic for this embodiment of the invention may be porous or non-porous. Porous ceramic is somewhat preferred as it will facilitate the removal of the hydrogen and carbon monoxide product gases resulting from the final burnoff of the carbonaceous matter in the metallic features by pore diffusion.

Figure 4:
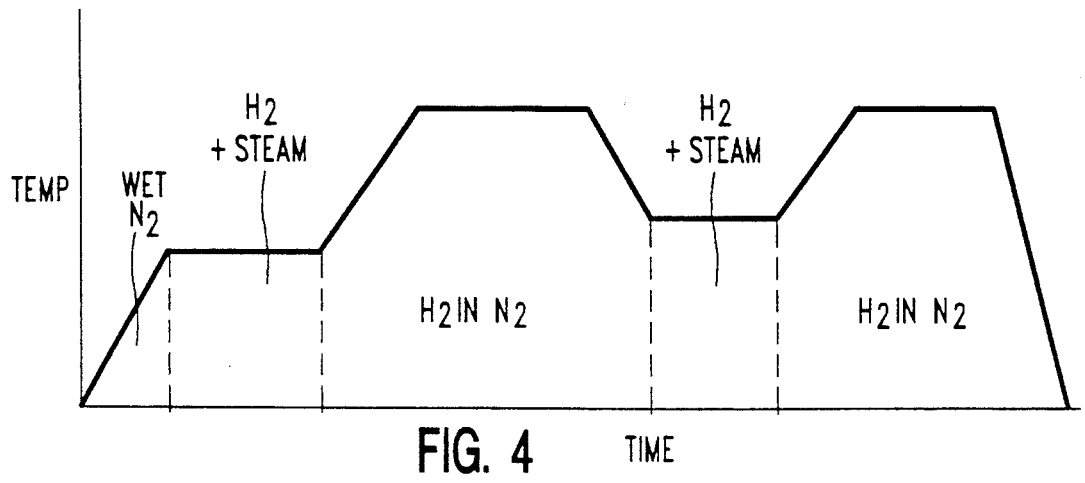

Another sintering profile useful for the present invention is illustrated in FIG. 4. This profile is identical in nature to FIG. 3 up to the sintering of the ceramic material to high temperature. However, in this case, now the temperature is reduced back down to binder burnoff temperature range and the atmosphere is changed to an oxidizing ambient such as wet hydrogen. This segment is essentially a second binder burnoff. After the carbonaceous residues are removed, the atmosphere is changed to a non-oxidizing atmosphere and the temperature is ramped up again to that necessary for the sintering of the ceramic material. This time, however, it is the metallic features that undergo densification with concomitant optimization of their physical properties.

For the sintering profile just described, it is again preferred that the ceramic material be porous so that carbonaceous material of the metal particles is accessible through the porous ceramic body to the reactant gas during the second binder burnoff segment of the sintering cycle.

It has also been found useful to have a second sintering inhibitor in the metallic features. Such a sintering inhibitor might be alumina or an alumina-forming compound such as copper aluminate. This second sintering inhibitor is useful for inhibiting the sintering of the metallic features at lower temperatures such as where binder burnoff occurs but at higher temperatures, such as where sintering of the ceramic material occurs, this sintering inhibitor is not very effective.

In the sintering profile illustrated in FIG. 4, it has been found particularly advantageous to have this second sintering inhibitor. At the sintering temperature of the ceramic material, the second inhibitor is not effective but there is the presence of carbonaceous matter in the metallic features to prevent the sintering of the metallic features. When the temperature is reduced to renew binder burnoff from the metallic features, the carbonaceous matter is removed, thereby also removing the inhibitor that prevents the sintering of the metallic features at higher temperatures. The presence, however, of the second inhibitor retards any sintering of the metallic features that might take place at this temperature. Once the temperature is again raised to the sintering temperature of the ceramic material, the second inhibitor loses its effectiveness and sintering of the metallic features can proceed.

The second sintering inhibitor is most desirable when the natural densification temperature of the metal in the metallic feature is below the temperature required to remove carbon. For example, when copper is used as the metal in a glass ceramic material, the binder burnoff temperature is between about 700 and 800 degrees Centigrade, which is well above the natural densification temperature of copper. It is thus expected that a second sintering inhibitor with the copper and the carbonaceous matter would be effective in the sintering profile of FIG. 4. On the other hand, when molybdenum is used as the metal in an alumina material, the binder burnoff temperature is between about 1000 and 1200 degrees Centigrade which is below the natural densification temperature of molybdenum. It is thus expected that a second sintering inhibitor with the molybdenum and the carbonaceous matter would not be necessary in the sintering profile of FIG. 4.

Figure 5A:
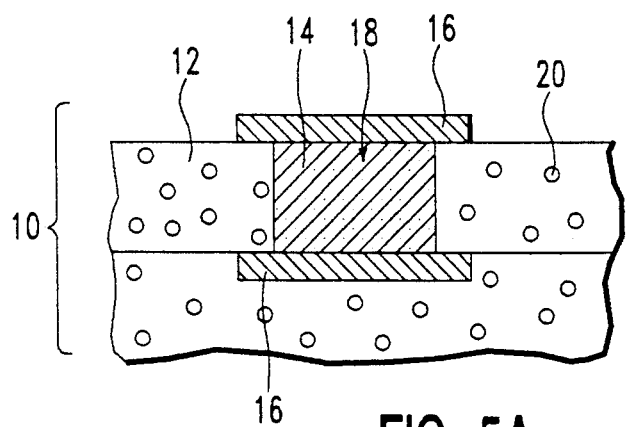
FIGS. 5A and are partial cross-sectional views of a preferred embodiment of the invention.
Figure 5B:
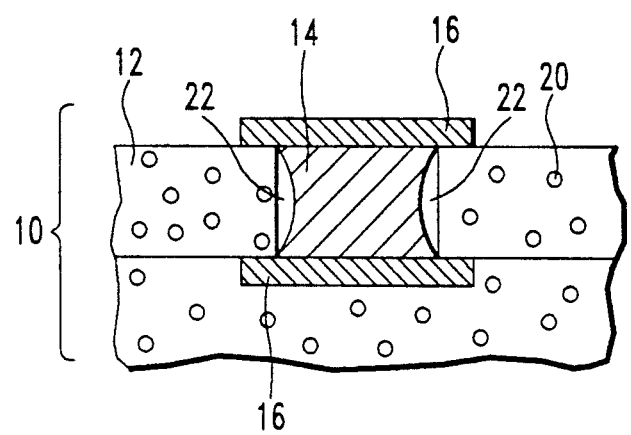
FIG. 5B illustrates the final structure after the metallic feature has sintered.

A preferred application of the invention is illustrated in FIGS. 5A and 5B. A substrate 10 comprises ceramic material 12 and a metallic via 14. Capture pads 16 have been applied by decal technology. Decals may be formed by depositing conductive metal lines and pads on a carrier sheet and then photolithographically defining those lines and pads. The decal is then placed on a substrate such as a greensheet and the carrier sheet is removed. The decal is advantageous, among other reasons, because solid metal lines and pads can be formed. FIG. 5A shows the substrate 10 after the ceramic material 12 has been sintered but before the via 14 has been sintered. Via 14 has carbonaceous matter 18 present which has prevented the sintering of the via 14. If preferred, ceramic 12 may have porosity 20. After the carbonaceous matter 18 in via 14 is removed by any of the methods discussed above, the via 14 may be sintered. The resulting substrate 10 is shown in FIG. 5B. Since pads 16 are solid metal, they do not shrink during sintering. Via 14, however, being a paste initially, undergoes substantial shrinkage during sintering, creating gap 22 between the via 14 and ceramic 12. Via 14 does become pinned at the ends to pads 16, thereby assuring the physical and electrical integrity of the substrate 10. Although a decal was used in this illustration as a capture pad, it could well have been similarly demonstrated with screened lines using paste similar to the via fill paste.

The invention, as noted earlier, is believed to be generally applicable to many combinations of ceramic materials and metallic features. The ceramic material may be, but not limited to, for example, alumina, mullite, glass plus ceramics such as borosilicate glass that includes ceramic additives, and glass ceramics such as cordierite. The metal of the metallic feature may be, but not limited to, palladium, gold, silver or copper in the low fired ceramics and tungsten or molybdenum in the more refractory ceramics.

In a most preferred embodiment of the invention, the ceramic may be selected from the cordierite and spodumene glass ceramic materials disclosed in Kumar U.S. Pat. No. 4,301,324. Other glass ceramic materials include, for example, eucryptite and anorthite. The preferred metal for the metallic features is copper. Glass ceramic materials are a recognized class of materials which begin as glasses but upon heating undergo devitrification and become at least partially crystallized. Some examples are given in Table 1.

nate (an alumina-forming compound) based on the total solids content of the sample. Example IV contained no additional components. The mixtures were then pressed into pellets and sintered. The results are indicated below.

EXAMPLE I

Several samples were sintered similar to the sintering profile illustrated in FIG. 4 except that the first binder burnoff segment was deleted. Thus, the sample was ramped up from room temperature to about 450° C. in wet nitrogen at which point the atmosphere was switched to 1% $H_2$ in $N_2$ and the temperature was ramped up to about 975° C. After holding at this temperature for about 2 hours, the temperature was ramped

TABLE 1

GLASS CERAMIC COMPOSITIONS (WEIGHT PERCENT)

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 55.0 | 54.5 | 54.5 | 52.3 | 57.8 | 60.0 | 50.0 | 53.9 | 54.0 | 55.0 | 60.0 | 54.5 |
| $Al_2O_3$ | 21.1 | 21.0 | 21.0 | 19.7 | 22.2 | 18.2 | 22.9 | 20.7 | 21.0 | 21.0 | 17.0 | 20.0 |
| MgO | 22.3 | 19.8 | 19.8 | 24.0 | 16.0 | 17.8 | 22.2 | 19.6 | 19.0 | 18.0 | 18.0 | 20.0 |
| $B_2O_3$ | 1.3 | 1.0 | 1.0 | 1.0 | 1.0 | 1.0 | 1.1 | 1.0 | 1.0 | 1.0 | 1.0 | 1.0 |
| $P_2O_5$ | 0.3 | 2.7 | 2.7 | 3.0 | 3.0 | 3.0 | 1.8 | 2.8 | 3.0 | 3.0 | 3.0 | 1.5 |
| $CeO_2$ |  | 1.0 |  |  |  |  |  |  |  |  |  |  |
| MnO |  |  | 1.0 |  |  |  |  |  |  |  |  |  |
| $ZrO_2$ |  |  |  |  |  |  |  |  | 2.0 |  |  | 2.0 |
| CaO |  |  |  |  |  |  |  | 2.0 |  |  |  | 1.0 |
| NiO |  |  |  |  |  |  |  |  |  | 2.0 |  |  |
| $Li_2O$ |  |  |  |  |  |  |  |  |  |  | 1.0 |  |
| $Fe_2O_3$ |  |  |  |  |  |  |  |  |  |  |  |  |
| $Na_2O$ |  |  |  |  |  |  |  |  |  |  |  |  |
| $TiO_2$ |  |  |  |  |  |  |  |  |  |  |  |  |
| ZnO |  |  |  |  |  |  |  |  |  |  |  |  |
| CuO |  |  |  |  |  |  |  |  |  |  |  |  |

|  | 13 | 14 | 15 | 16 | 17 | 18 | 19 | 20 |
|---|---|---|---|---|---|---|---|---|
| $SiO_2$ | 57.0 | 55.0 | 47.0 | 53.9 | 54.0 | 54.5 | 54.0 | 54.0 |
| $Al_2O_3$ | 21.0 | 21.0 | 33.5 | 20.8 | 22.0 | 21.3 | 22.0 | 21.0 |
| MgO | 20.0 | 22.0 | 13.5 | 19.6 | 20.0 | 19.9 | 20.0 | 22.0 |
| $B_2O_3$ | 1.0 | 2.0 | 3.0 | 1.0 | 1.0 | 1.0 | 1.0 | 1.0 |
| $P_2O_5$ | 1.0 |  | 3.0 | 2.7 | 2.0 | 2.8 | 2.0 |  |
| $CeO_2$ |  |  |  |  |  |  |  |  |
| MnO |  |  |  |  |  |  |  |  |
| $ZrO_2$ |  |  |  |  |  |  |  |  |
| CaO |  |  |  |  |  |  |  |  |
| NiO |  |  |  |  |  |  |  |  |
| $Li_2O$ |  |  |  |  |  |  |  |  |
| $Fe_2O_3$ |  |  |  | 2.0 |  |  |  |  |
| $Na_2O$ |  |  |  |  | 1.0 |  |  |  |
| $TiO_2$ |  |  |  |  |  | 1.0 |  |  |
| ZnO |  |  |  |  |  |  | 1.0 |  |
| CuO |  |  |  |  |  |  |  | 2.0 |

The precise amount of carbonaceous matter in the metallic features will vary depending upon the ceramic and metallic materials. It is known that for the preferred glass ceramic materials with copper metallic features, the carbonaceous matter should be present in the metallic features at the time of sintering of the ceramic in the amount of at least about 1000 to 2500 ppm (parts per million).

The purposes and advantages of the present invention will become more apparent after referring to the following Examples.

EXAMPLES

A number of samples were prepared to demonstrate the effectiveness of the present invention. All the samples basically consisted of copper particles mixed with an ethyl cellulose binder and standard organic additives such as plasticizers, flow control agents and solvents. In Example I, the copper particles were coated with alumina which varied from 0 to 400 ppm. Examples II and III contained about 0.5 weight percent of copper alumidown to about 720° C. The atmosphere was switched to $H_2$ plus steam and held at 720° C. for about 20 hours for binder burnoff. The atmosphere was then switched to 1% $H_2$ in $N_2$, the temperature was ramped back up to about 975° C. and held there for about 2 hours, followed by cooldown to room temperature.

An analysis of the samples indicated that the residual carbon left in the samples was about 25 ppm and the samples had densified to 90+% of theoretical density.

EXAMPLE II

Several samples were sintered by ramping up to about 450° C. in wet $N_2$, then the atmosphere was changed to 1% $H_2$ in $N_2$ and the temperature was ramped up to about 975° C., held at this temperature for two hours and then cooled down to room temperature. The samples thus experienced pyrolysis but no binder burnoff.

The analysis of the samples indicated their carbon content to be around 1550 ppm and their density to be about 59% of theoretical density. Their starting density in the green state was recorded as 58-59% of the theoretical density. Therefore, this sample exhibited minimal densification indicating that this relatively small concentration of carbonaceous matter inhibited sintering, and virtually stopped shrinkage of the copper preform even though it was held near the melting point for an extended period of time.

EXAMPLE III

A single sample was sintered by ramping up the temperature to about 720° in an atmosphere of wet $N_2$. Thereafter, the atmosphere was switched to 1% $H_2$ in $N_2$ and the temperature was ramped up to 975° C. for a two hour hold followed by cooldown to room temperature. Although the carbon content was not measured at this point, based on past experience, the sample should have about 1500 ppm of carbon. This sintering cycle was then repeated.

The sample was determined to have 1000 ppm carbon and a density of 74% of theoretical density after the second sintering cycle. It is believed that this sample had lower carbon content and greater density than Example II samples because the sample of Example III experienced essentially two pyrolysis segments. The pyrolysis segment will cause the removal of some of the carbonaceous residue although it is not nearly as efficient as the binder burnoff segment in removing the carbonaceous residue.

EXAMPLE IV

The single sample in this example was heated by ramping up the temperature to about 450° C. in wet $N_2$ followed by cooldown to room temperature. The sample was then removed to a dilatometer where the temperature was ramped up to about 975° C. in an atmosphere of 1% $H_2$ in $N_2$ and held there for two hours, followed by cooldown to room temperature.

The sample was analyzed and found to have a carbon content of 1376 ppm carbon and a density of 63.7% of theoretical. The density of the sample in the green, unsintered state was 62% of theoretical density. The data indicates that the presence of the carbon residue resulted in essentially no densification of the sample similar to Example II.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A method of controlling the densification behavior of a metallic feature in a ceramic material, the method comprising the steps of:
    obtaining an unsintered ceramic material having at least one metallic feature therein;
    providing at least the metallic feature with a carbonaceous material in the amount of 1000-2500 ppm at a temperature at which the ceramic material will undergo sintering, said sintering being characterized by the onset of neck growth between adjacent ceramic particles;
    heating the ceramic material and metallic feature to a temperature sufficient to cause sintering of the ceramic material, the metallic feature being at least partially inhibited from desifying at the ceramic sintering temperature by the presence of the carbonaceous material while the ceramic material undergoes sintering.

2. The method of claim 1 further comprising the steps of:
    removing the carbonaceous material from the metallic feature after the sintering of the ceramic material by exposing the metallic feature to an ambient which is oxidizing with respect to the carbonaceous material; and
    heating the metallic feature at a temperature at which desification of the metallic feature will occur so as to cause densification thereof.

3. The method of claim 2 wherein the ceramic material after sintering has a density which is less than 90% of theoretical density.

4. The method of claim 1 wherein the metallic feature is a via or line.

5. The method of claim 1 wherein the ceramic material after sintering has a density which is less than 90% of theoretical density.

6. The method of claim 1 wherein the metallic feature contains alumina.

7. A method of controlling the densification behavior of a metallic feature in a ceramic material, the method comprising the steps of:
    obtaining an unsintered ceramic material having at least one metallic feature therein, the ceramic material comprising ceramic particles in a polymeric matrix, the metallic feature comprising metallic particles in a polymeric matrix;
    pyrolyzing in an oxidizing atmosphere the polymeric materials that make up the polymeric matrices of the ceramic material and metallic feature, the metallic feature after pyrolysis containing an amount of carbonaceous material sufficient to at least partially inhibit the densifying of the metallic feature at a temperature at which the ceramic material undergoes sintering, said sintering being characterized by the onset of neck growth between adjacent ceramic particles; and
    heating in a non-oxidizing atmosphere the ceramic material and metallic feature to the ceramic sintering temperature to cause sintering of the ceramic material, the metallic feature being at least partially inhibited from densifying at the ceramic sintering temperature by the presence of the amount of carbonaceous material while the ceramic material undergoes sintering.

8. The method of claim 7 wherein the ceramic material after pyrolysis contains an amount of carbonaceous material from the pyrolysis of its polymeric matrix.

9. The method of claim 8 further comprising the step, between pyrolyzing and heating, of burning out in an oxidizing atmosphere the carbonaceous residues from the polymeric amtrix of the ceramic material and at least partially burning out the carbonaceous residue from the polymeric matrix of the metallic feature.

10. The method of claim 9 wherein the polymeric matrices of the ceramic material and metallic material comprise different polymeric materials such that the polymeric material comprising the polymeric matrix of the ceramic material burns more cleanly than the polymeric material comprising the polymeric matrix of the metallic features.

11. The method of claim 9 wherein in the step of obtaining an unsintered material having at least one metallic feature therein, the metallic feature further comprises a carbonaceous material additive in addition to the unpyrolyzed polymeric matrix.

12. The method of claim 11 wherein the carbonaceous material additive is graphite or carbon black.

13. The method of claim 9 further comprising the steps of:
removing the remainder of the carbonaceous material from the metallic feature after sintering of the ceramic material by changing the atmosphere to an oxidizing atmosphere and burning out the carbonaceous material; and
heating the metallic feature at a temperature at which desification of the metallic feature will occur so as to cause densification thereof.

14. The method of claim 13 wherein the ceramic material after sintering has a density which is less than 90% of theoretical density.

15. The method of claim 8 wherein during the step of heating, after the ceramic material has been sintered in a non-oxidizing atmosphere, the atmosphere is changed to an oxidizing atmosphere and the carbonaceous residues from the polymeric matrices of the ceramic material and metallic feature are burned out and the metallic feature is then sintered.

16. The method of claim 15 wherein the ceramic material after sintering has a density which is less than 90% of theoretical density.

17. The method of claim 7 further comprising the steps of:
removing the carbonaceous material from the metallic feature after sintering of the ceramic material by changing the atmosphere to an oxidizing atmosphere and burning out the carbonaceous material; and
heating the metallic feature at a temperature at which densification of the metallic feature will occur so as to cause densification thereof.

18. The method of claim 7 further comprising the step, after the step of heating, of reducing the temperature below the ceramic sintering temperature, changing the atmosphere to an oxidizing atmosphere and burning out the carbonaceous residues from the polymeric matrices of the ceramic material and metallic feature.

19. The method of claim 7 wherein the metallic feature is a via or line.

20. The method of claim 7 wherein the ceramic material after sintering has a density which is less than 90% of theoretical density.

21. The method of claim 7 wherein the metallic feature contains alumina.

22. The method of claim 7 wherein the amount of carbonaceous material is 1000 to 2500 ppm.

* * * * *

UNITED STATES PATENT AND TRADEMARK OFFICE
CERTIFICATE OF CORRECTION

PATENT NO. : 5,302,562
DATED : April 12, 1994
INVENTOR(S) : R J Bezama, D R Wall It is certified that error appears in the above-indentified patent and that said Letters Patent is hereby corrected as shown below:

In Column 10, line 14, please delete "desification" and insert --densification--.

Signed and Sealed this

Eighth Day of April, 1997

Attest:

BRUCE LEHMAN

*Attesting Officer*     *Commissioner of Patents and Trademarks*